Figure 6:
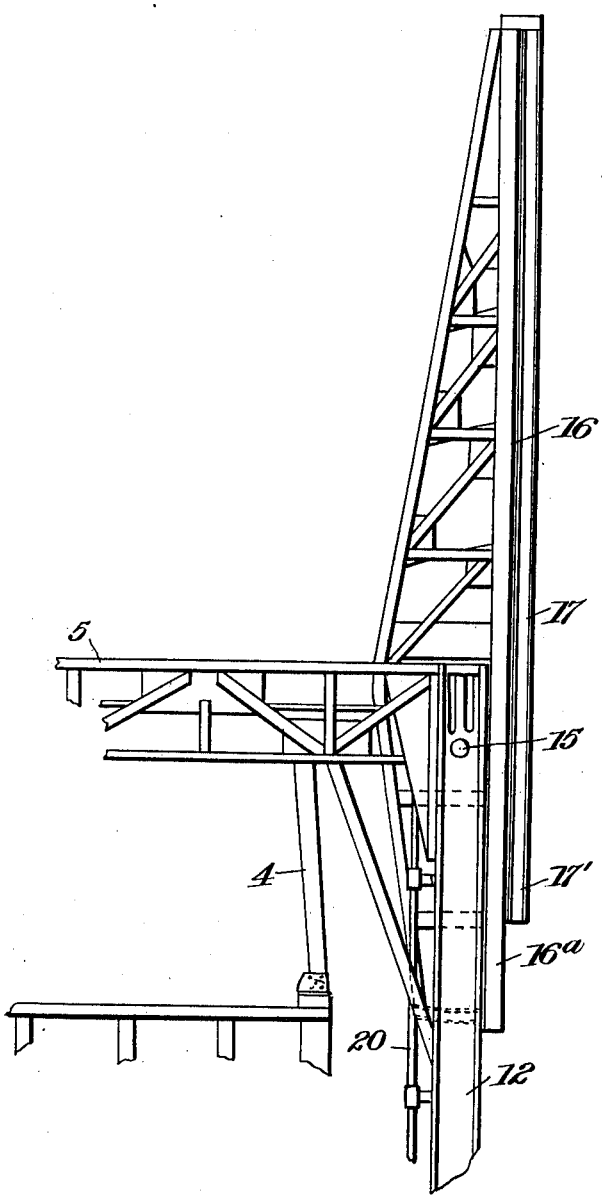

E. B. MILLER.
APPARATUS FOR ELEVATING, TRANSPORTING, AND DISCHARGING MATERIAL.
APPLICATION FILED JULY 17, 1911.
1,021,063.
Patented Mar. 26, 1912.
4 SHEETS—SHEET 1.
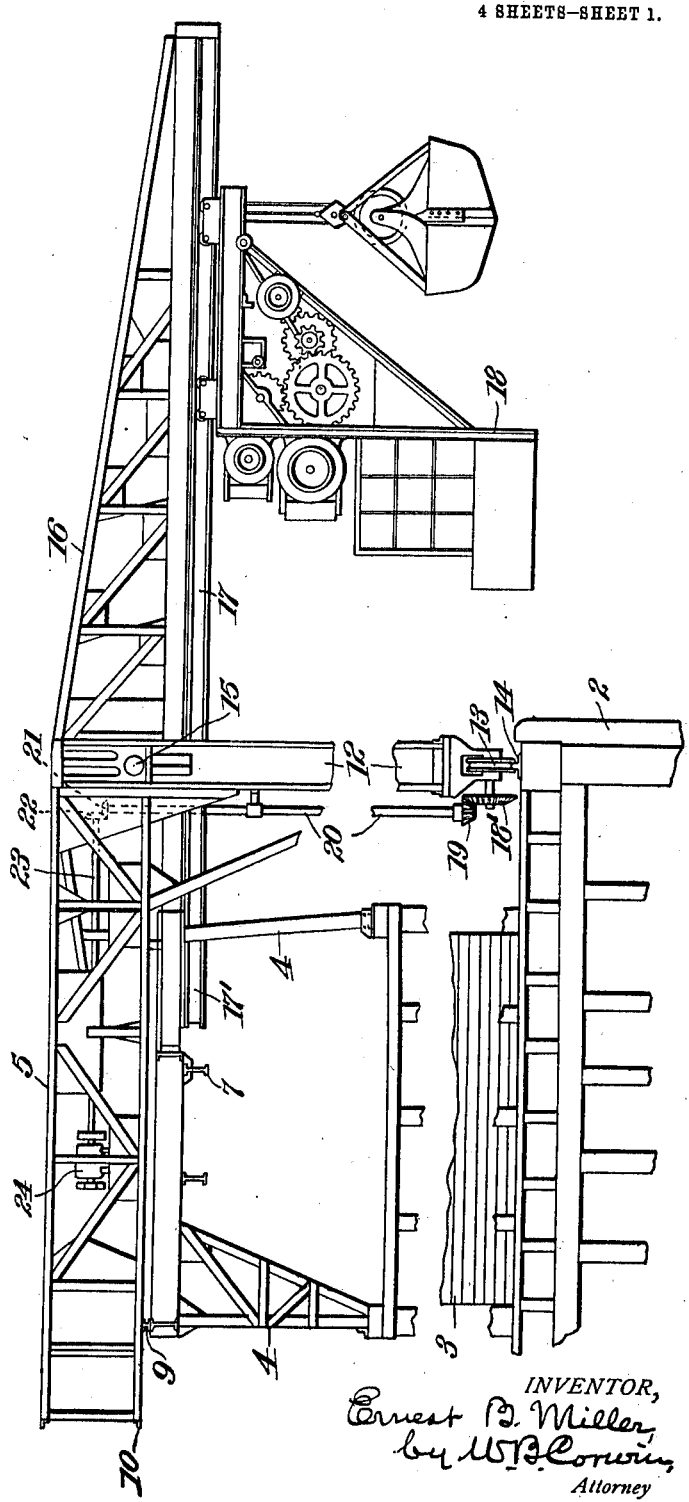

E. B. MILLER.
APPARATUS FOR ELEVATING, TRANSPORTING, AND DISCHARGING MATERIAL.
APPLICATION FILED JULY 17, 1911.
1,021,063.  Patented Mar. 26, 1912.
4 SHEETS—SHEET 2.
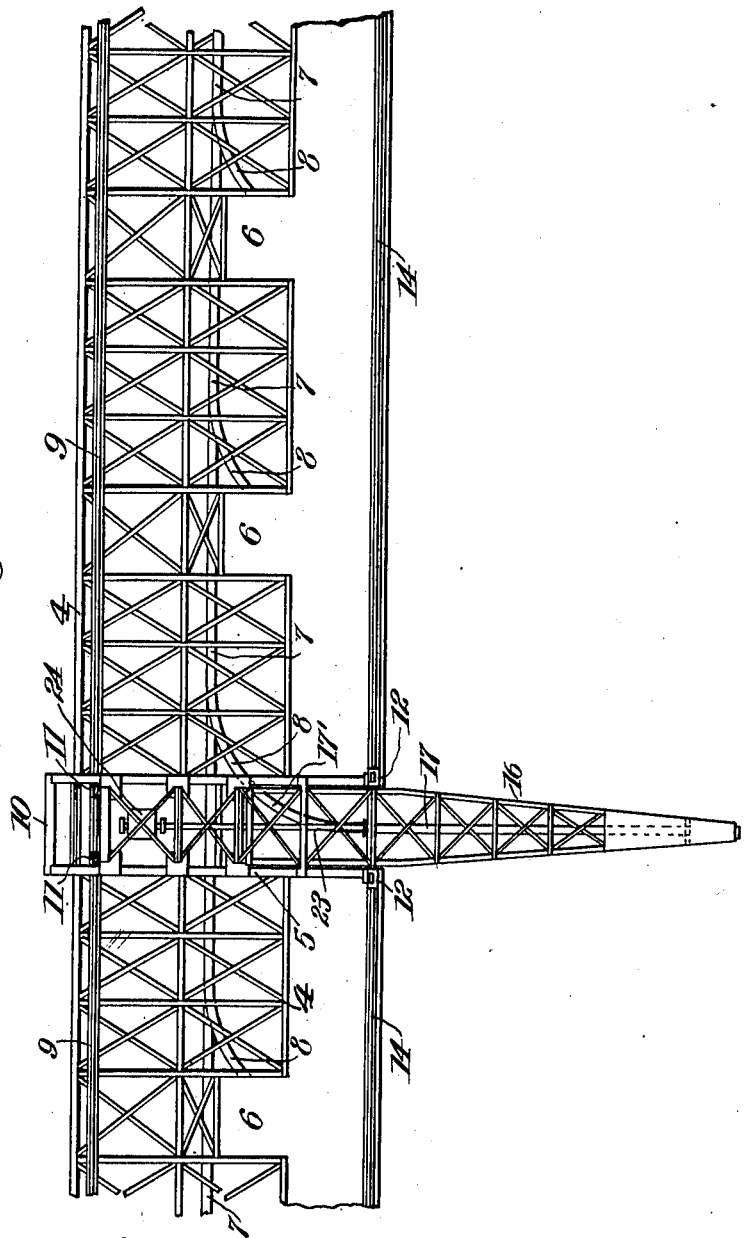
WITNESSES  INVENTOR
Ernest B. Miller,
by W. B. Corwin
Attorney E. B. MILLER.
APPARATUS FOR ELEVATING, TRANSPORTING, AND DISCHARGING MATERIAL.
APPLICATION FILED JULY 17, 1911.
1,021,063.
Patented Mar. 26, 1912.
4 SHEETS—SHEET 3.
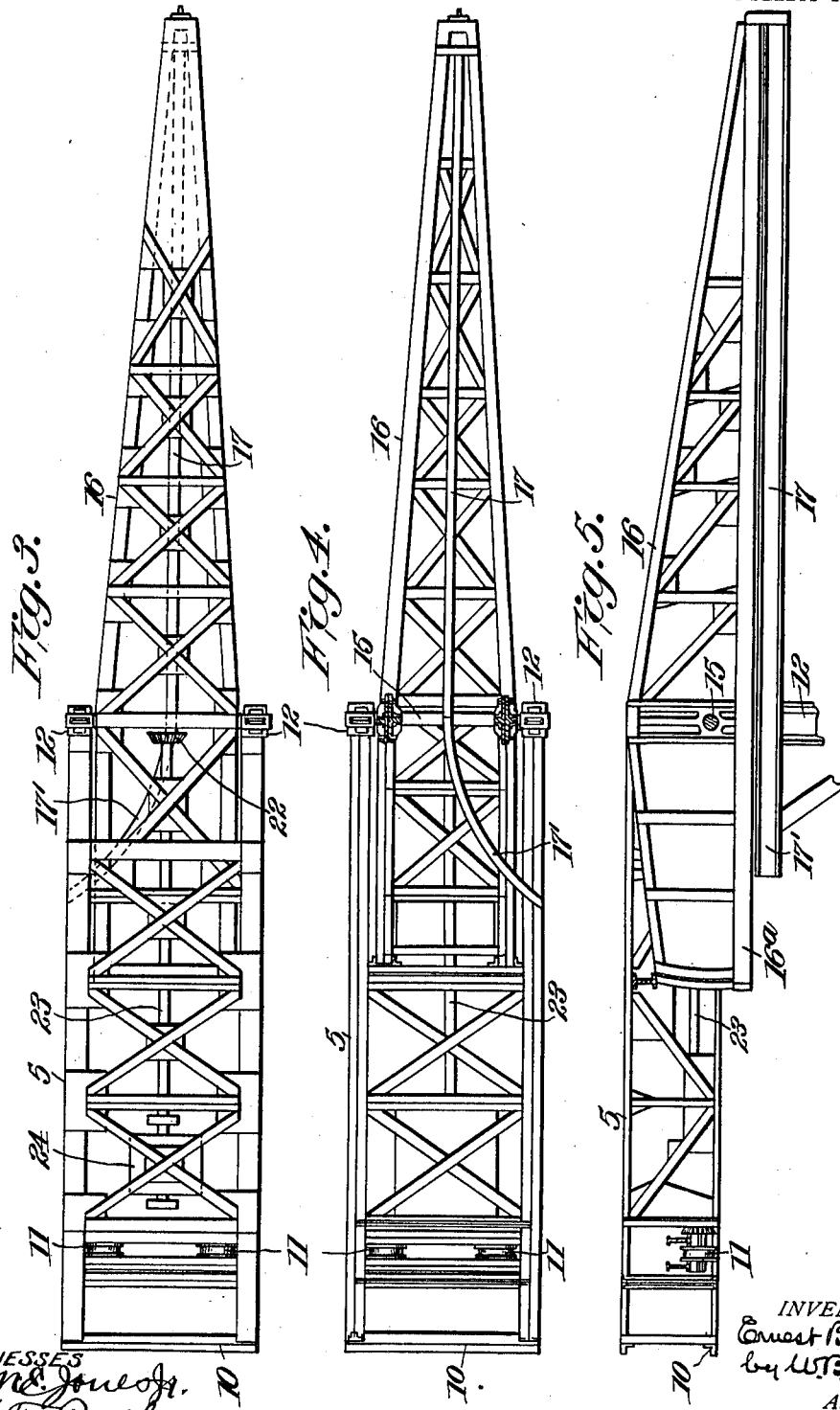

E. B. MILLER.
APPARATUS FOR ELEVATING, TRANSPORTING, AND DISCHARGING MATERIAL.
APPLICATION FILED JULY 17, 1911.

1,021,063.

Patented Mar. 26, 1912.

4 SHEETS—SHEET 4.

UNITED STATES PATENT OFFICE.

ERNEST B. MILLER, OF BALTIMORE, MARYLAND.

APPARATUS FOR ELEVATING, TRANSPORTING, AND DISCHARGING MATERIAL.

1,021,063. Specification of Letters Patent. Patented Mar. 26, 1912.

Application filed July 17, 1911. Serial No. 639,075.

*To all whom it may concern:*

Be it known that I, ERNEST B. MILLER, a citizen of the United States, and resident of Baltimore, in the State of Maryland, have invented a new and useful Improvement in Apparatus for Elevating, Transporting, and Discharging Material, of which the following is a specification.

My invention is particularly directed to apparatus for loading or unloading material, as ores, coal, &c., in bulk from boats, although obviously it may be used in connection with other sorts of material.

Heretofore, difficulty has been experienced in unloading large scows and other forms of freight-carrying boats by reason of the fact that such boats are provided with a row or rows of hatches, and the unloading apparatus is compelled to travel along from one hatch to another. No difficulty has been experienced in doing this where the dock was clear and tracks could be laid along its upper surface on which the apparatus as an entirety might travel. But where the dock was encumbered with bins for the ore, coal, etc., it was necessary to lay the tracks along above the bins, and difficulty has been encountered in constructing an apparatus which would work satisfactorily under these conditions, especially where it is necessary that the power medium for causing the travel of the operator's cage or carriage, for lowering and raising the buckets, and for closing and opening the buckets, is carried upon and travels with the cage or carriage instead of being stationary and independent of the same.

My invention is directed toward obviating such objections, and I will now describe the same, reference being had to the accompanying drawings, forming part of this specification, in which—

Figure 1 is an end elevation, partially broken away, of a structure embodying my improved elevating, transporting, and discharging apparatus. Fig. 2 is a top plan view of the same. Fig. 3 is a top plan view of the movable unloading device. Fig. 4 is a bottom plan view, and Fig. 5 is a longitudinal vertical section of the same. Fig. 6 is an end view showing the unloading device in its vertical position ready to be moved on its supporting structure from place to place.

Like symbols of reference indicate like parts in the several figures.

Referring to the drawings:—2 indicates an ordinary dock or pier, having built thereon a bin or storage structure 3. Above the bin structure is an iron framework 4, suitably trussed and braced, upon which the unloading apparatus or framework 5 travels from one position to another. Along one side of the framework 4, openings or breaks in the framework are made, the purpose of which will be explained hereinafter. These openings or breaks are indicated by the numeral 6. A track or way, in the form of a monorail 7, upon which the cage or carriage (hereinafter described) is adapted to travel is formed along the surface of the upper portion of the framework 4. This track or rail 7 is provided near the openings or breaks 6 with switch-pieces 8.

9 is a track or way upon which one end 10 of the unloading apparatus is adapted to travel by means of the wheels 11, the other end of the unloading device or framework 5 being supported by a vertical framework 12, traveling by means of wheels 13 upon a track 14 running along one side of the dock. Mounted in the framework 12, by means of a horizontal shaft 15, is a boom or jib 16 consisting of a framework trussed and braced in any desired manner. The inner and shorter end 16ª of the boom 16 is adapted to be swung into an upstanding or vertical position, bringing its outer end also into a vertical position, as indicated in Fig. 6. This movement of the boom may be accomplished by manual power or by suitable power mechanism not necessary to be described as it form no part of my invention. Along the lower surface of the boom is mounted a monorail 17, upon which the cage or carriage 18, for carrying the operator, and the power mechanism for effecting the travel of the cage, the raising and lowering of the buckets, and their opening and closing, is adapted to travel. At its inner end, the rail 17 is curved as at 17', adapting it to connect and form a continuation of the curved switch-pieces 8 of the main monorail 7 of the framework 4. The horizontal frame 5 and the vertical frame 12 may be moved on the tracks or ways 9 and 14 by manual power or by means of a bevel-pinion 18' mounted on the axle of one of the wheels 13 of the frame 12, said bevel-pinion meshing with a bevel-wheel 19 at the lower end of a vertical shaft 20, carrying at its upper end a bevel-wheel 21 meshing with a bevel-pinion 22 on the end of a horizontal shaft 23, which shaft 23 may be rotated in any suitable or desired manner, as, for example, by an electric motor 24 carried by the frame 10.

The operation of my improved elevating, transporting, and discharging apparatus is as follows:—Suppose it is desired to unload a vessel from one particular hatch:—The boom 16 is swung to the vertical position shown in Fig. 6, and its inner end 16ª, in such a position, being entirely clear of the outer side of the frame 4, the frame 5—12, carrying the boom with it, is free to be moved on its tracks 9 and 14 to a position opposite the particular hatch it is desired to unload. The boom 16 is then swung to a horizontal position, the inner end of the boom rising and swinging inwardly and entering one of the openings or breaks 6, and being locked thereby the frame 5—12 is prevented from further movement along the frame 4 in either direction. When the boom is in its horizontal position, the curved extension 17' of the monorail 17, as described above, registers with the curved switch-piece 8 of the main monorail 7. The operator's cage or carriage 18 may then be moved from the main rail 7 on to and along the rail 17'—17 to such position as to bring the buckets 24 over the hatch of the boat. The buckets in an open position are then lowered into the hold, and by proper manipulation of the mechanism from the cage 18 are filled, closed, and elevated from the hold. The cage 18 is then moved along the track 17—17' and switch-piece 8 on to the main rail 7, and along said rail 7 to the point of discharge. When discharged the cage is returned for another load, the operations just described being repeated, and this is continued until that portion of the vessel is unloaded. The cage 18 is then moved off the boom on to the main rail 7, and the boom is again swung to its vertical position, and the frame 5—12 is moved to another point of discharge, when the boom is swung to its horizontal position, the inner end 16ª entering another opening or break 6, and the operation of unloading just described is repeated. The movement of the boom from place to place is continued until the vessel has been completely emptied of its cargo.

The advantages of my invention will be readily apparent to those skilled in the art, and it will be obvious that various changes may be made in the construction of my improved apparatus without departing from the spirit of the invention or sacrificing any of its advantages.

I claim:—

1. In an apparatus for elevating, transporting, and discharging material, the combination of a stationary frame provided with a cage or carriage carrying rail, a movable frame extending transversely of the stationary frame and adapted to be moved along the same; and a vertically-swinging boom or jib pivoted in said movable frame at one side thereof, said boom or jib having a rail on its underside adapted when the boom is in a horizontal position to register with the cage or carriage carrying rail of the stationary frame.

2. In an apparatus for elevating, transporting, and discharging material, the combination of a stationary frame provided at one side with a track or way, and provided also with a cage or carriage carrying rail, a movable frame extending transversely of the stationary frame and provided at one end with wheels adapted to travel on said track or way and at the other end with a vertically-depending extension adapted to travel on a second track or way at a lower level than the first named track, and a vertically-swinging boom or jib pivoted to said vertically-depending extension, said boom or jib having a rail adapted when the boom is in a horizontal position to register with the cage or carriage-carrying rail.

3. In an apparatus for elevating, transporting, and discharging material, the combination of a stationary frame having at one side a series of openings or breaks, said frame being provided with a cage or carriage carrying rail, a movable frame extending transversely of the stationary frame and adapted to be moved along the same, and a vertically-swinging boom or jib pivoted to said movable frame, the inner end of the boom when swung to a horizontal position being adapted to extend into any one of said series of openings or breaks when the boom is brought opposite the same and to be clear of said opening and of the stationary frame when the boom is swung to a vertical position, said boom or jib having a rail adapted when the boom is in a horizontal position to register with the cage or carriage carrying rail.

In witness whereof I have hereunto set my hand.

ERNEST B. MILLER.

Witnesses:
E. E. WELLS,
GEO. W. DAVISON.

---

Copies of this patent may be obtained for five cents each, by addressing the "Commissioner of Patents, Washington, D. C."